July 31, 1928.

J. DE LA CIERVA 1,678,935

AIRCRAFT WITH ROTATIVE WINGS

Filed Nov. 10, 1926

Inventor:
J de la Cierva
by Fisher ᴅunbaugh & Co
Attys.

Patented July 31, 1928.

1,678,935

UNITED STATES PATENT OFFICE.

JUAN DE LA CIERVA, OF MADRID, SPAIN.

AIRCRAFT WITH ROTATIVE WINGS.

Application filed November 10, 1926, Serial No. 147,570, and in Great Britain November 24, 1925.

This invention relates to aircraft with freely rotating hinged-wing systems of the type described in my patent specification No. 1,590,497 and is directed more particularly to improvements relative to the control of the aircraft.

In aircraft of this type, an automatic centering of aerodynamical pressure is obtained by the method of hingedly jointing the wings to the axis of rotation, and it has been found that, without in any way interfering with its natural stability, lateral control of the aircraft may be obtained by varying the inclination of the axis of rotation and consequently the mean plane of rotation of the wings relatively to the vertical axis of symmetry of the aircraft.

The present invention therefore primarily consists in mounting the wing supporting member constituting the general axis of rotation of the wings in such a manner that it is capable of variable lateral inclination.

In the case of light machines where the inertia of the wing system is relatively small this adjustment of lateral inclination may be effected by hand operated means through a gear constructed to give the necessary mechanical advantage. In other cases the operating means may embody a servo mechanism of any convenient type, and a feature of the invention consists in employing as the source of power for this servo mechanism the kinetic energy possessed by the rotating wing system in flight.

Constructional forms of control arrangements in accordance with the present invention are illustrated in the accompanying drawings, which are more or less diagrammatic in character and intended more particularly to enable the invention to be understood and applied in practice by persons skilled in the art than to illustrate exact constructional details which will obviously vary with different types of aircraft and the nature and measure of control required.

In these drawings:—

Figure 1:
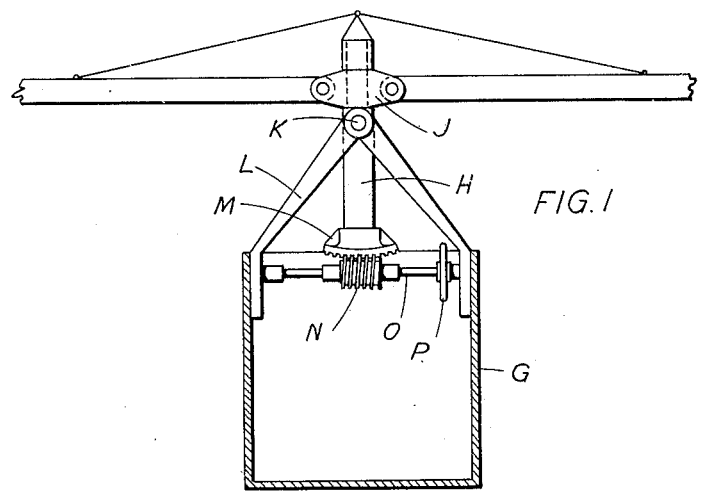
Figure 2:
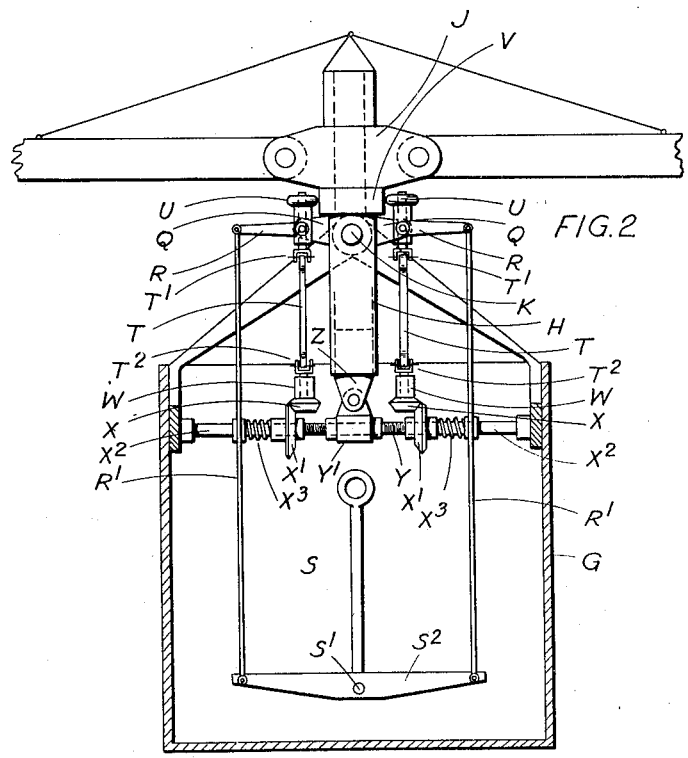

Fig. 1 shows a direct hand-operated gear for adjusting the lateral inclination of the wing system, and Fig. 2 illustrates diagrammatically one form of hand controlled servo mechanism utilizing the energy of the rotating wings to adjust the lateral inclination of the system.

In both these figures G represents a transverse section through the cockpit of the aircraft. A non-rotative shaft H carrying the revolving hub member J to which the wings are hingedly jointed, is tiltably mounted in bearings K in the supporting structure L, usually consisting of three or four members arranged in pyramid form.

In Fig. 1, the lower end of the shaft H carries a toothed segment M engaged by relatively slow pitch worm N on a transverse shaft O mounted in suitable bearings in the body of the aircraft and turned by a hand wheel P. If the mechanical advantage is insufficient to enable the shaft H to be inclined without imposing too great an effort on the operator, any convenient form of reduction gear may be included.

In Fig. 2 the tubular shaft H is provided with laterally extending bosses Q to which are pivoted bell crank levers R connected through rods $R^1$ to a cross-head $S^2$ pivoted at $S^1$ and carrying a control lever S, the arrangement being such that the operator may use his feet on the cross head $S^2$ to assist or as an alternative to the hand lever S.

The shorter arms of bell crank lever R serve as bearings for shafts T universally jointed at $T^1$ and $T^2$ and carrying at their upper ends friction pinions U normally out of contact with a friction wheel V which revolves fast with the hub member J to which the wings are jointed. The lower ends of the shaft T are supported in bearings W, and are connected through friction bevel gearing X, $X^1$ to a slow pitch worm Y working through a threaded nut $Y^1$ pivotally jointed to a piece Z slidable in the hollow shaft H.

The friction wheels $X^1$ are slidably splined on the shaft $X^2$ and loaded by strong springs $X^3$ acting to thrust the gearing into engagement.

The operation is as follows:—

With the control lever S in central position the friction pinions U are out of engagement with the friction wheel V. When it is desired to incline the wing system to the left, that is to say to move the lower end of the shaft H to the right, the control lever S is moved over to the left thereby bringing the right hand friction pinion U into frictional engagement with the wheel V, the right hand shaft T being turned and transmitting its motion to the worm Y through the bevel gear $XX^1$, the threaded nut $Y^1$ being moved to the right. The pivots of the bell crank levers R move with the shaft H and hence the relative positions of the bell crank pivots and the friction wheel V do not vary. When the inclination is sufficient the control lever S is moved back to central or neutral position disengaging the pinion U from the wheel V whereupon the movement of the shaft H ceases due to the inertia of the wing system, and the mechanism remains set with the shaft at that inclination. Locking means to hold the shaft in adjusted positions are probably unnecessary but may be provided if found desirable. In order to prevent excessive inclination of the shaft H and any possibility of its fouling the bevel gearing X X¹, the ends of the nut Y¹ are arranged to come into contact with one or other of the bevel wheels X¹ when a predetermined limit of movement has been reached, after which further movement forces the gearing out of engagement against the compression of the springs X³, and stops rotation of the worm Y.

When the wing system is to be inclined in the opposite sense, that is to say when the lower end of the shaft H is to be moved to the left, the control lever is moved over to the right thereby engaging the left hand friction pinion U with the wheel V, the worm Y being turned in the opposite sense to that above described.

What I claim is:—

1. In aircraft, a plurality of freely rotative wings adapted to be driven by the air flow across them in flight, a central hub member to which said wings are hinge-jointed, a shaft carrying said hub member and tiltably mounted in the body of the air craft so as to be capable of variable lateral inclination.

2. In aircraft, a plurality of freely rotative wings adapted to be driven by the air flow across them in flight, a hub member to which said wings are hinge-jointed, a shaft carrying said hub member and mounted in the body of the air craft so as to be capable of variable lateral inclination and manually operable means for effecting such inclination.

3. In aircraft, a plurality of freely rotative wings adapted to be driven by the air flow across them in flight, a hub member to which said wings are hinge-jointed, a shaft carrying said hub member and mounted in the body of the aircraft so as to be capable of variable lateral inclination, a toothed segment on said shaft, a transverse shaft mounted in the body of the air craft, a worm carried by said transverse shaft and engaging the toothed segment and a hand wheel for turning said worm.

4. In aircraft, a plurality of freely rotative wings adapted to be driven by the air flow across them in flight, a hub member to which said wings are hinge-jointed, a shaft carrying said hub member and mounted in the body of the aircraft so as to be capable of variable lateral inclination, and a servo-mechanism deriving its power from the rotating wings and operating under manual control to adjust the inclination of the shaft.

5. In aircraft, a plurality of freely rotative wings adapted to be driven by the air flow across them in flight, a hub member to which said wings are hinge-jointed, a shaft carrying said hub member and mounted in the body of the aircraft so as to be capable of variable lateral inclination, a friction wheel carried by the hub member, friction pinions adjustably mounted so as to be moved into and out of engagement with the friction wheel, gearing connecting said pinions to a shaft transversely disposed in the body of the aircraft, a worm on said transverse shaft, a threaded member connected to the wing-supporting shaft and engaging said worm, and manually operable means for engaging and disengaging one or the other of the friction pinions with the friction wheel.

6. In aircraft, a plurality of freely rotative wings adapted to be driven by the air flow across them in flight, a hub member to which said wings are hinge-jointed, a shaft carrying said hub member and mounted in the body of the aircraft so as to be capable of variable lateral inclination, a friction wheel carried by the hub member, friction pinions adjustably mounted so as to be moved into and out of engagement with the friction wheel, gearing connecting said pinions to a shaft transversely disposed in the body of the aircraft, a worm on said transverse shaft, a threaded member connected to the wing-supporting shaft and engaging said worm, manually operable means for engaging and disengaging one or the other of the friction pinions with the friction wheel, and automatically acting means for disengaging the gearing so as to limit the inclination of the wing-supporting shaft.

JUAN DE LA CIERVA.